United States Patent
Aebischer

(10) Patent No.: US 8,290,793 B2
(45) Date of Patent: Oct. 16, 2012

(54) METHOD AND SYSTEM FOR DETERMINING A RISK OF LOSSES

(75) Inventor: Christophe Aebischer, Zurich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 996 days.

(21) Appl. No.: 12/161,696

(22) PCT Filed: Jan. 23, 2006

(86) PCT No.: PCT/CH2006/000047
§ 371 (c)(1),
(2), (4) Date: Nov. 7, 2008

(87) PCT Pub. No.: WO2007/082392
PCT Pub. Date: Jul. 26, 2007

(65) Prior Publication Data
US 2011/0046984 A1 Feb. 24, 2011

(51) Int. Cl.
*G06Q 40/00* (2012.01)

(52) U.S. Cl. .............. 705/4; 705/35; 705/36 R; 705/38
(58) Field of Classification Search ............... 705/4, 35, 705/36 R, 38
See application file for complete search history.

(56) References Cited

U.S. PATENT DOCUMENTS

| | | | |
|---|---|---|---|
| 6,405,179 B1 * | 6/2002 | Rebane | 705/36 R |
| 7,050,999 B1 * | 5/2006 | Ota | 705/37 |
| 7,580,852 B2 * | 8/2009 | Ouimet et al. | 705/7.31 |
| 7,702,548 B2 * | 4/2010 | Zumbach et al. | 705/35 |
| 2002/0161677 A1 * | 10/2002 | Zumbach et al. | 705/35 |
| 2004/0133492 A1 * | 7/2004 | Stricker | 705/35 |
| 2007/0129981 A1 * | 6/2007 | Jang et al. | 705/8 |
| 2008/0167905 A1 * | 7/2008 | Bredl et al. | 705/4 |

* cited by examiner

*Primary Examiner* — Jagdish Patel
*Assistant Examiner* — Sara C Hamilton
(74) *Attorney, Agent, or Firm* — Oblon, Spivak, McClelland, Maier & Neustadt, L.L.P.

(57) ABSTRACT

A method and a system for determining a risk of losses, which can be implemented as a computer-implemented method and a computer system for determining for an institution the risk of losses associated with a line of business.

27 Claims, 4 Drawing Sheets

METHOD AND SYSTEM FOR DETERMINING A RISK OF LOSSES

FIELD OF THE INVENTION

The present invention relates to a method and a system for determining a risk of losses. Specifically, the present invention relates to a computer-implemented method and a computer system for determining for an institution the risk of losses associated with a line of business.

BACKGROUND OF THE INVENTION

In pricing a deal for an insurance contract or establishing a benchmark for a given industry segment, one of the main challenges is the quantification of the risk of losses in a high excess ("xs") zone that might be well above the largest (trended) historical loss at hand. Almost always, high excess regions are the domain of reinsurance companies and a quantification as accurate as possible is simply crucial. A common technique called extrapolation consists in fitting the trended historical data and using the fit in the region beyond the historical losses. It is not known, however, whether this curve that fits well some data up to a few millions will correctly quantify the risk in regions that lie an order of magnitude above the last known loss, say at a hundred millions or even at one billion. Very much in the spirit of the credibility theory, one definitely has to rely on a greater set of data representative of the situation being considered for determining a relevant probability distribution for a high excess region. However, applying directly such a methodology to pricing a deal is lengthy and cumbersome since it involves each time collecting data from comparable industries, fitting the data, and mixing the fit with the one from the account loss history. Furthermore, an extrapolation of the industry data is also needed, which calls for collecting an even wider set of data. For a benchmark-type study the same issues need to be faced, starting one level higher. In the latter case the amount of work involved for a proper extrapolation may be a lot smaller in comparison with the size of the whole project itself, but the whole process would have to be repeated for each benchmark test, and the knowledge gained from this tailor-made extrapolation would not necessarily be considered as an independent result.

SUMMARY OF THE INVENTION

It is an object of this invention to provide a method and a system for determining the risk of losses associated with a line of business, which system and method do not have the disadvantages of the prior art. In particular, it is an object of the present invention to provide a computer-implemented method and a computer system for determining for an institution a risk of losses associated with a line of business.

According to the present invention, these objects are achieved particularly through the features of the independent claims. In addition, further advantageous embodiments follow from the dependent claims and the description.

According to the present invention, the above-mentioned objects are particularly achieved in that, for determining for an institution a risk of losses associated with a line of business, selected is a loss distribution function having a cumulative distribution function with a strictly negative second derivative and a tail characteristic associated with the line of business; a starting excess point is selected in a range of known historical losses of the institution; the loss distribution function is fixed to the starting excess point; and the loss distribution function is fitted to the historical losses. For example, the tail characteristic is selected from a table comprising different tail characteristics associated with different lines of business, and these different tail characteristics are each determined from historical losses, associated with the respective line of business. Selecting, fixing and fitting a loss distribution function of the described qualities makes it possible to determine with one continuous loss distribution function the risk of losses in high excess zones that might be well above the largest (trended) historical loss at hand. The continuity of the loss distribution function ensures that there are no sudden and unjustified jumps of prices in a risk insurance, for example, caused by discontinuities in the loss distribution function established through conventional methods.

Preferably, selected is a loss distribution function that is reducible to a Convex Beta distribution, the Convex Beta distribution being derived from the Generalized Beta distribution by setting $\alpha_{Pareto}=\alpha\cdot\rho$ and $\beta=1/\rho$, and by keeping $\omega=\omega$ and $\rho=\rho$. Moreover, the starting excess point is selected from values greater than zero.

In a preferred embodiment, selecting the loss distribution function includes, for a line of business associated with a Pareto tail characteristic, selecting a Convex Beta distribution, the Convex Beta distribution being derived as described above.

In a further preferred embodiment, the value of $\alpha_{Pareto}$ is selected specifically for the line of business, and the loss distribution function is fitted to the historical losses by adjusting parameters $\rho$ and $\omega$ of the Convex Beta distribution. For example, the value of $\alpha_{Pareto}$ is selected from a table comprising different values of $\alpha_{Pareto}$ associated with different lines of business, and these different values of $\alpha_{Pareto}$ are each determined from historical losses, associated with the respective line of business.

In different embodiments, selecting the loss distribution function includes, for a line of business associated with a Pareto tail characteristic, selecting one of Convex Beta distribution, Second Pareto distribution, Pareto distribution, and Convex Logistics distribution, the Convex Logistics distribution being derived from the Inverse Burr distribution by setting $\beta=1/\rho$ and $\alpha_{Pareto}=\rho$, and by keeping $\omega=\omega$.

In yet a further preferred embodiment, selecting the loss distribution function includes, for a line of business associated with an exponential tail characteristic, selecting one of Convex Gamma distribution, Benktander distribution, and Exponential distribution, the Convex Gamma distribution being derived from the Transformed Gamma distribution by setting $\alpha=1/\omega$ and $\omega_{New}=1/\beta$, and by keeping $\rho=\omega$.

In an embodiment, selecting the loss distribution function includes, selecting from a table a tail threshold specific to the line of business, and issuing an alert message when the tail threshold exceeds the known historical losses by a defined margin, for example a defined order of magnitude. For such cases, where the known historical losses are significantly lower than the tail threshold, the risk associated with losses beyond the tail threshold are assessed too aggressively thus resulting in prices that are too low. Consequently, an alert message is issued to inform the user about the exceptional scenario and/or the course of the loss distribution function beyond the tail threshold is determined in an alternative way.

In a further embodiment, selecting the loss distribution function includes, selecting a Convex Loggamma distribution, the Convex Loggamma distribution being derived from the Transformed Loggamma distribution by setting $\alpha=1/\omega$, $\omega_{New}=\beta^{1/\omega}$, and $\rho=\omega$. By selecting the Convex Loggamma distribution as the loss distribution function, a compromise is made between the Pareto tail characteristic and the exponential tail characteristic. Such a compromise may be desirable, for example, in cases where the tail characteristics are unknown for a line of business or where the tail characteristics are prominent only outside the data range to be considered.

In yet a further embodiment, selecting the loss distribution function includes, for a line of business associated with a Pareto tail characteristic and for a starting excess point higher than a tail threshold specific to the line of business, selecting the Pareto distribution and selecting from a table $\alpha_{Pareto}$ specific to the line of business.

It is another object of this invention to provide a method and a system for determining for an insurance account a risk of losses associated with a certain type of risk. For determining for the insurance account the risk of losses associated with the certain type of risk, selected is a loss distribution function having a cumulative distribution function with a negative second derivative and a tail characteristic associated with the type of risk; a starting excess point is selected in a range of known historical losses associated with the insurance account; the loss distribution function is fixed to the starting excess point; and the loss distribution function is fitted to the historical losses.

It is a further object of this invention to provide a method and a system for determining for an entity impacted by a certain type of random event an estimated distribution of random event occurrence. Examples of entities include institutions, industries, companies, states, countries, people or species. For determining for the entity impacted by the certain type of random event the estimated distribution of random event occurrence, selected is a random event distribution function having a cumulative distribution function with a negative second derivative and a tail characteristic associated with the type of random event; selected is a starting excess point in a range of known historical random event occurrences associated with the entity; the random event distribution function is fixed to the starting excess point; and the random event distribution function is fitted to the historical random event occurrences.

In addition to a computer-implemented method and/or a computer system for determining for an institution a risk of losses associated with a line of business, for determining for an insurance account a risk of losses associated with a certain type of risk, and/or for determining for an entity impacted by a certain type of random event an estimated distribution of random event occurrence, the present invention also relates to a computer program product including computer program code means for controlling one or more processors of a computer such that the computer performs these method(s). Particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
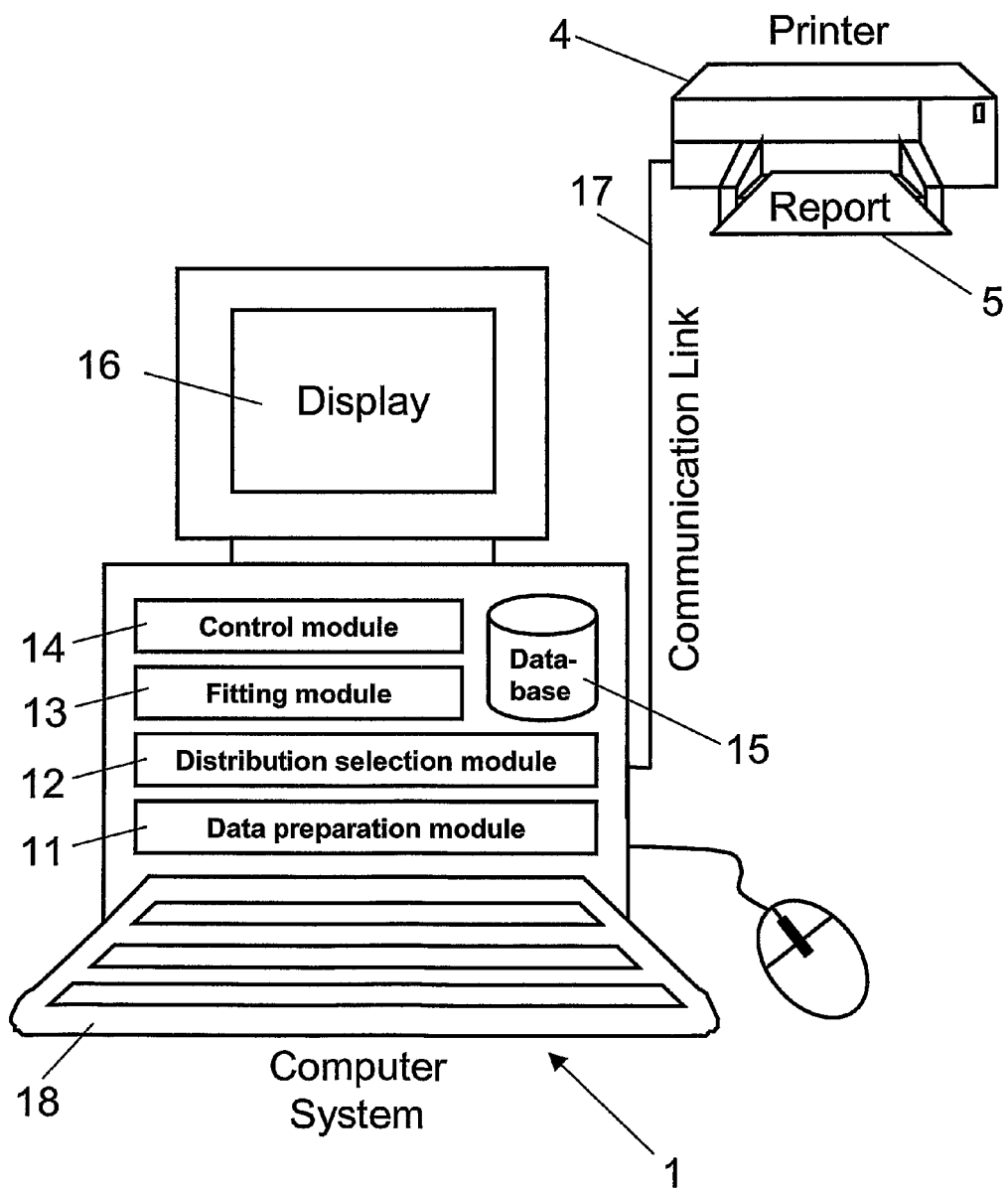
FIG. 1 shows a block diagram illustrating schematically an exemplary configuration of a computer system for practicing embodiments of the present invention, said configuration comprising a computer with a display, a processor and memory, and said configuration being connected to a printer terminal.

In FIG. 1, reference numeral 1 refers to a computer system. The data processing system 1 includes one or more computers, for example personal computers, comprising one or more processors, and data and program memory. As is illustrated schematically, the computer system 1 comprises a display 16 and data entry means 18, such as a keyboard and a computer mouse or the like. Furthermore the computer system 1 is connected through a communication link 17 with a printer terminal 4.

As is illustrated schematically in FIG. 1, computer system 1 further includes a database 15 and various functional modules namely a data preparation module 11, a distribution selection module 12, a fitting module 13, and a control module 14. Preferably, these functional modules and the functionality of the database 15 are implemented as programmed software modules. The computer program code of the software modules is stored in a computer program product, i.e. in a computer readable medium, either in memory integrated in a computer of computer system 1 or on a data carrier that can be inserted into a computer of computer system 1. The computer program code of the software modules controls the computer(s) of the computer system 1 such that the data processing system executes various functions described later in more detail with reference to FIG. 2.

The database 15 includes data about known historical losses of one or more institutions/industries, about known historical losses associated with one or more insurance accounts, and/or about known historical random event occurrences associated with one or more entities as outlined earlier. Database 15 also includes tail characteristics, i.e. different types of tails of distribution functions, associated with different lines of business of one or more institutions/industries, with different types of risks associated with different insurance accounts, and/or with different types of random events impacting different entities. The tail characteristics include Pareto tail characteristic and exponential tail characteristic. In addition, a compromise marker may indicate a desired interpolation between a Pareto tail characteristic and an exponential tail characteristic. The tail characteristics are determined through analysis of the respective historical data. For the Pareto tail characteristic, the database 15 also includes parameters $\alpha_{Pareto}$ assigned to the different lines of business of the institutions, the different types of risks associated with the insurance accounts, and/or the different types of random events impacting the entities. The parameters $\alpha_{Pareto}$ are determined from the respective historical data using conventional methods such as maximum likelihood and linear regression.

Furthermore, database 15 includes tail thresholds associated with the tail characteristics of the different lines of business of the institutions, the tail characteristics of the different types of risks associated with the insurance accounts, and/or the tail characteristics of the different types of random events impacting the entities.

The control module 14 is designed to control a user interface visualized on display 16 as well as the process flow of the other functional modules. For a selected line of business of an institution, a selected type of risk associated with an insurance account, or a selected type of random event impacting an entity, the control module 14 activates the data preparation module 11.

Figure 2:
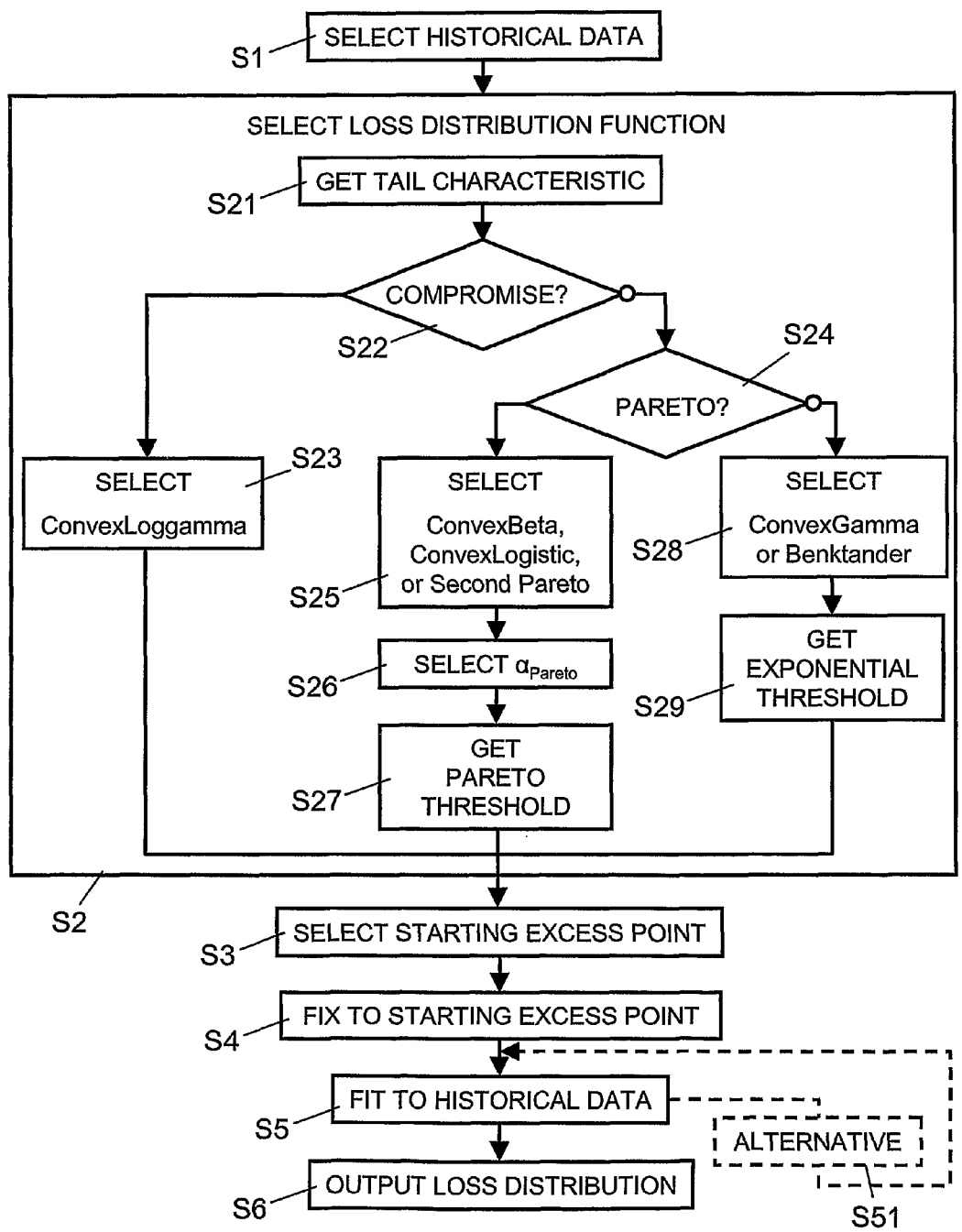
FIG. 2 shows a flow diagram illustrating an example of a sequence of steps executed according to the present invention for determining the risk of losses.

The data preparation module 11 is configured to select, in step S1 of FIG. 2, from database 15, the historical data associated with the selected line of business of the institution, the selected type of risk associated with the insurance account, or the selected type of random event impacting the entity. The historical data to be taken into account should have a sufficiently high excess (xs) point, while enough data is kept. As a rule of thumb, a value as low as the relevant currency equivalent of 50,000 or 100,000 USD is usually still acceptable, while 250,000 to 1 Mio. USD would be more typical: this depends on the typical scale for losses of the respective account/industry. The more regular the data and the higher its quality, the better is the quality of the outcome.

Figure 4:
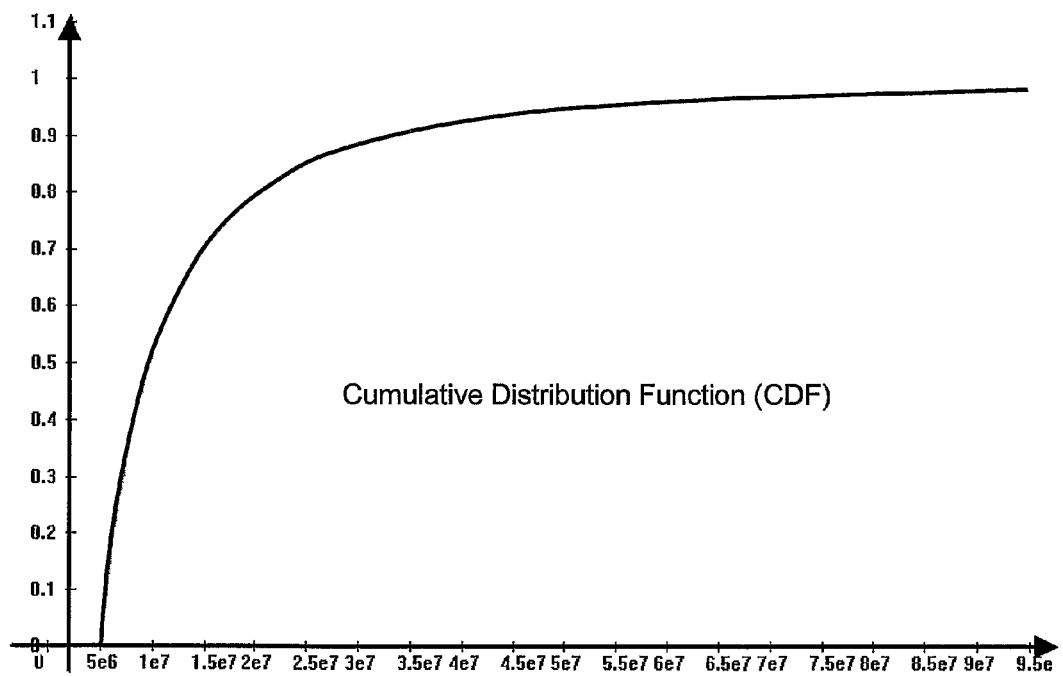
FIG. 4 shows a loss distribution function having a cumulative distribution function with a strictly negative second derivative.

Subsequently, the control module 14 activates the distribution selection module 12. The distribution selection module 12 is configured to select, in step S2 of FIG. 2, a loss distribution function having a cumulative distribution function (CDF) with a strictly negative second derivative, as shown in FIG. 4, and a tail characteristic associated with the line of business, the type of risk, or the type of random event, respectively.

In step S21, the distribution selection module 12 determines from database 15 the tail characteristic associated with the selected line of business, type of risk, or type of random event, respectively.

A loss distribution is not determined uniquely by its tail. Two important characteristics of the CDF are of great influence, namely the slope of the CDF at the excess point and the shape of the CDF beyond the excess point.

If the slope at the starting excess point $x_0$ is large enough, say at least 500' or higher, as confirmed by historical data at the line of business (LoB), industry segment, the slope of the CDF will always be finite and non zero at $x_0$. All loss distributions analyzed follow the same pattern: the slope is finite and non-zero at the beginning and there is no inflexion point thereafter, meaning that the second derivative is always strictly negative. Moreover, the lower the slope at the excess point, the more severe the distribution will be. Another important feature of the "high excess" loss distributions is that the severity is systematically decreasing from the excess point to the entry into the asymptotic regime. In the present context, severity relates to a measure of the local severity, which can be measured as the slope of the CDF in a log-log plot, i.e. the logarithmic derivative of 1 minus the CDF:

$$S(x) := -\frac{d\ln(1 - F(x))}{d\ln x}$$

Where S stands for slope, the severity is increasing when the slope is decreasing. For Pareto of course, the slope S is a constant, the exponent $\alpha$ itself. This means that Pareto has a constant severity all along. For distributions having a Pareto tail with exponent $\alpha$, we always observe that $S(x)<\alpha$ with S monotonously increasing from the excess point to the tail threshold for entering the Pareto regime, where it reaches the value $\alpha$ that is constant thereafter. This means that the severity is at its highest at the excess point and that it decreases up to the point where it enters into the Pareto regime, where it assumes a constant value.

For the exponential distribution, we have $$S(x) = \frac{x}{\omega}$$

where $\omega$ is the scale parameter, which means that the slope is ever increasing until it becomes infinite, with, correspondingly, the severity going to zero for an Exponential distribution. For distributions exhibiting a non-Pareto behavior that is exactly what is observed: the local slope is monotonously increasing and never assumes constant value that would be characteristic of a Pareto regime.

The distributions that fulfill the aforementioned criteria will be called Convex Distributions. A convex loss distribution will have either a Pareto or an Exponential tail (a third alternative, interpolating between a Pareto or Exponential tail, will described later), a finite slope at the origin (i.e. the starting excess point), and no inflexion point. Convex loss distributions are derived from the usual loss distributions by taking out one parameter to enforce convexity. Consequently, convex distributions have one parameter less than the standard loss distributions. The discarded parameter is not suitable for high excess fitting as it permits an infinite or a zero slope at the origin. Moreover, having exactly the right number of parameters, the convex distributions are no longer over-parametrized and thus very well suited for high excess fitting.

There are four convex distributions in the Pareto family: Convex Beta, Convex Logistic, Second Pareto and of course Pareto itself. The most general and the most useful distribution of this class is Convex Beta. Convex Beta, the convex flavor of Generalized Beta, has three parameters ($\alpha_{Pareto}$, $\rho$, $\omega$), parameter $\alpha_{Pareto}$ being the Pareto $\alpha$ but not the original $\alpha$ of the Generalized Beta distribution ($\alpha_{GB}$). As a matter of fact, the Generalized Beta distribution has a power-law, i.e. a Pareto tail whose exponent is $\alpha_{GB} \cdot \rho = \alpha$.

The Convex Beta distribution $F_{CB}(\alpha_{Pareto}, \omega, \rho)$ is derived from the Generalized Beta distribution, using the following scheme:

$\alpha \rightarrow \alpha_{Pareto} = \alpha \cdot \rho$
$\beta \rightarrow$ fixed at $1/\rho$ (parameter disappears)
$\omega \rightarrow \omega$
$\rho \rightarrow \rho$ The Convex Beta distribution $F_{CB}$ has the following CDF:

$$F_{CB}(x) = B\left(\frac{\alpha_{Pareto}}{\rho}, \frac{1}{\rho}, \frac{x^\rho}{x^\rho + \omega}\right),$$

where B is the incomplete Beta function; and the following probability density function (pdf):

$$f_{CB}(x) = \frac{\Gamma\left(\frac{\alpha_{Pareto} + 1}{\rho}\right)}{\Gamma\left(\frac{\alpha_{Pareto}}{\rho}\right)\Gamma\left(\frac{1}{\rho}\right)} \frac{\rho\omega^{\frac{\alpha_{Pareto}}{\rho}}}{(\omega + x^\rho)^{\frac{\alpha_{Pareto}+1}{\rho}}}.$$

Figure 3:
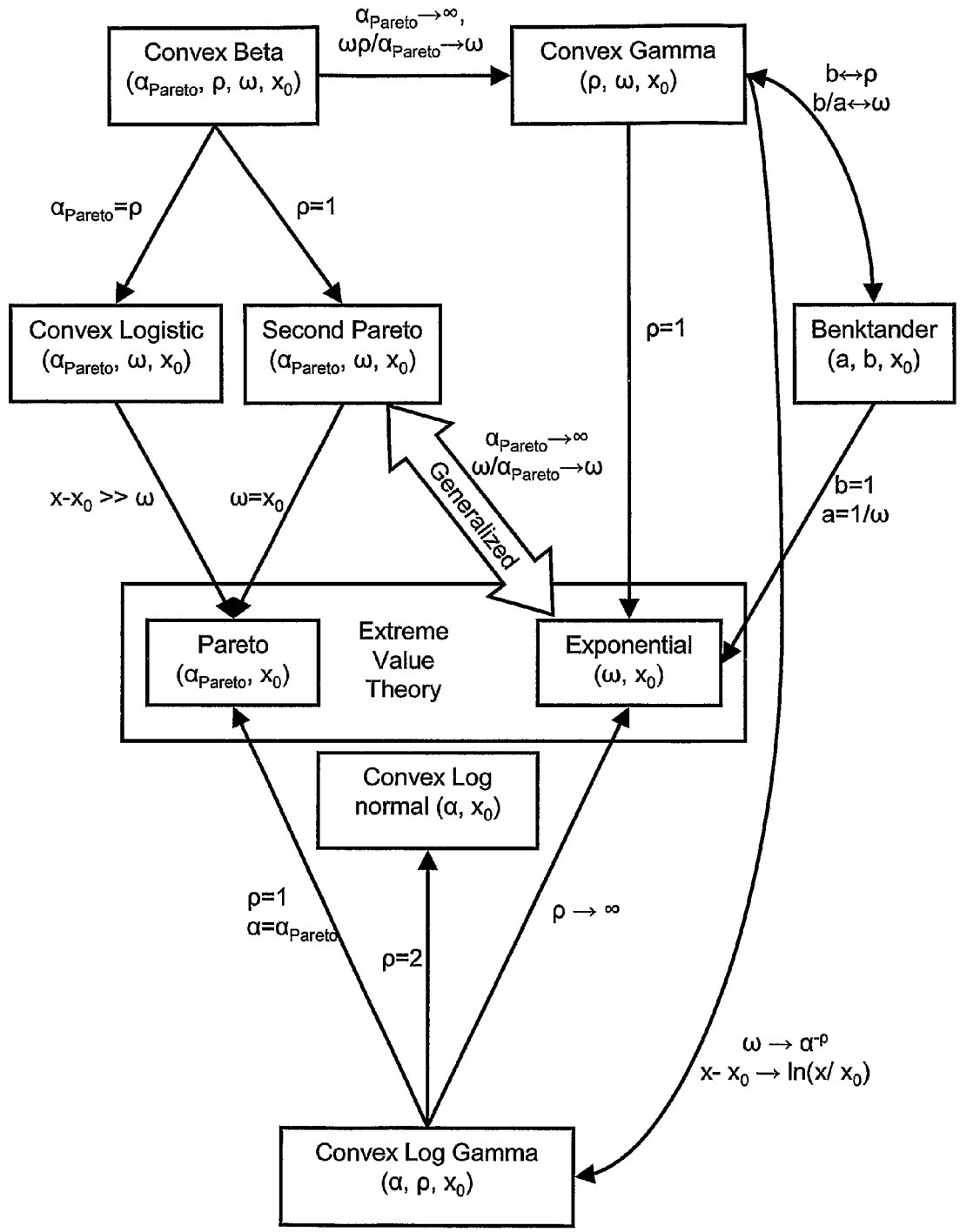
FIG. 3 shows an overview diagram illustrating various distribution functions that are derived from a Convex Beta distribution, which is part of the Generalized Beta family.

In FIG. 3, illustrated is the relationship between Convex Beta, Convex Logistic, Second Pareto and Pareto.

The Second Pareto distribution is obtained from the Convex Beta distribution by setting $\rho$ to 1. Convex Beta tends to Second Pareto in most cases where the excess point chosen for the fit is increased. Second Pareto will thus be more relevant for high excess fitting than Convex Beta. In fact, if the real, underlying distribution is Second Pareto, there is no point in attempting to fit Convex Beta by setting parameter ρ to 1 when this does not fully succeed due to numerical finite precision.

The Pareto distribution itself has the parameter ω merged with the excess point $x_0$.

The Convex Logistic distribution is derived from Convex Beta by setting $\alpha_{Pareto}=\rho$. As for Second Pareto, there is thus one parameter ($\alpha_{Pareto}$, ω) left for free fitting (the Pareto exponent is fixed). The larger ω, the more severe the distribution will be. However, there is no exact transformation from Convex Logistic to Pareto, for instance. Only the tail of Convex Logistic will ever be pure Pareto, but not the whole distribution itself, as is the case for Convex Beta or Second Pareto. That is why Convex Logistic stands a bit on its own, besides the other distributions of the Pareto family. Convex Logistic will only be used in some special cases where both Convex Beta and Second Pareto fail to reasonably fit the empirical data.

The Convex Logistic distribution is derived from the Inverse Burr distribution, using the following scheme:

β->fixed at 1/ρ (parameter disappears)

ω->ω

ρ->$\alpha_{Pareto}$=ρ

The Convex Logistic distribution $F_{CL}(\alpha_{Pareto}, \omega)$ has the following CDF:

$$F_{CL}(x) = \frac{x}{(\omega + x^{\alpha_{Pareto}})^{\frac{1}{\alpha_{Pareto}}}},$$

and the following pdf:

$$f_{CL}(x) = \frac{\omega}{(\omega + x^{\alpha_{Pareto}})^{\frac{1}{\alpha_{Pareto}}+1}}.$$

There are three convex distributions in the exponential family: Convex Gamma, Benktander and Exponential itself. Convex Gamma and Exponential are in fact part of the Convex Beta family in the broad sense, since letting the Pareto exponent in Convex Beta going to infinity (while keeping the distribution normalized) will lead to Convex Gamma itself. On the other hand, Benktander is a bit more isolated: it can be seen in fact as a Convex Gamma distribution modified to obtain an integrable pdf, i.e. a CDF that may be expressed in terms of standard functions, as opposed to the CDF of a Convex Gamma distribution that is expressed via the Gamma function.

The Convex Gamma distribution is derived from Transformed Gamma distribution, using the following scheme:

α->fixed at 1/ω (parameter disappears)

β->$\omega_{New}$=1/β

ω->ρ=ω

The Convex Gamma distribution $F_{CL}(\rho, \omega_{New})$ has the following CDF:

$$F_{CG}(x) = \frac{1}{\Gamma\left(\frac{1}{\rho}\right)}\Gamma\left(\frac{1}{\rho}, \frac{x^\rho}{\omega_{New}}\right);$$

and the following pdf:

$$f_{CG}(x) = \frac{\omega_{New}^{-1/\rho}\rho}{\Gamma\left(\frac{1}{\rho}\right)}e^{-\frac{x^\rho}{\omega_{New}}}.$$

In FIG. 3, illustrated is the relationship between Convex Gamma, Benktander and Exponential.

The Exponential distribution is obtained from the Convex Gamma distribution by setting ρ to 1. Convex Gamma tends to the Exponential distribution in every single case where the excess point chosen for the fit is increased. The Exponential distribution will thus be more relevant for high excess fitting than Convex Gamma. For practical purposes, however, Convex Gamma is much more useful, since one rarely has to deal with excess points in the Exponential regime alone.

The remaining member of the Exponential family, the Benktander distribution, has two free parameters, a and b. There is no exact analytical transformation to derive it from either Generalized Beta or Convex Beta. In fact, Benktander should rather be seen as a Convex Gamma distribution modified slightly to obtain an integrable CDF, i.e. a CDF that can be written in terms of standard functions (instead of having to use the Gamma function as for Convex Gamma, for instance). It is thus more like another flavor of Convex Gamma. Let us stress at that point that Benktander is not interpolating between Pareto and Exponential in the tail. It is falling back to Pareto at a=0 but this is not a realistic value for Benktander anyway, and as soon as a>0 there is actually a standard exponential tail. The parameter b plays the role of ρ from Convex Gamma and b/a has to be compared to the ω of Convex Gamma. However, as for Convex Gamma, through b=1 there exists an exact analytic transformation that brings Benktander back to the exponential distribution. This means that contrary to Convex Logistic, Benktander does not go in a dead end. Hence, it is just as useful as Convex Gamma.

When an interpolation between a Pareto distribution and an Exponential distribution is needed as a compromise between a Pareto tail characteristic and an exponential tail characteristic, a so-called Convex Loggamma distribution is used. A compromise is useful in cases where an Exponential tail may be indicated at least partly because there is a lack of large losses in the available historical data. An Exponential tail is a (very) light tail, which, depending on the position of the layer, may indicate a very low expected loss for the concerned layer and thus result in a pricing scheme that is too low. On the other hand, using by default a Pareto tail would probably be too conservative. The solution is to have a convex distribution whose tail interpolates between Pareto and Exponential behavior.

The Convex Loggamma distribution is derived from Convex Gamma by applying the usual logarithmic transformation for loss distribution, but conserving at the same time the scale invariance of Convex Gamma.

The Convex Loggamma distribution is derived from Transformed Loggamma, using the following scheme:

α->fixed at 1/ω (parameter disappears)

β->$\alpha_{New}$=$\beta^{1/\omega}$

ω->ρ=ω

Furthermore, a new parameter $x_0$ is introduced, with x->x/$x_0$.

The Convex Loggamma distribution $F_{CLG}(\alpha_{New}, \rho, x_0)$ has the following CDF:

$$F_{CLG}(x) = \frac{1}{\Gamma\left(\frac{1}{\rho}\right)} \Gamma\left(\frac{1}{\rho}, \left(\alpha_{New} \ln \frac{x}{x_0}\right)^\rho\right);$$

and the following pdf:

$$f_{CLG}(x) = \frac{\alpha_{New} \rho}{\Gamma\left(\frac{1}{\rho}\right)} \frac{1}{x} e^{-\left(\alpha_{New} \ln \frac{x}{x_0}\right)^\rho},$$

wherein the incomplete gamma function $\Gamma(\alpha, x)$ is defined as:

$$\Gamma(a, x) := \int_0^x dt\, e^{-t} t^{a-1}.$$

There is no closed formula for the moments, so the following infinite sum is used and cut at some point for a numerical evaluation:

$$\langle x^k \rangle = \frac{x_0^k}{\Gamma\left(\frac{1}{\rho}\right)} \sum_{n=0}^{\infty} \frac{(k/\alpha_{New})^n}{n!} \Gamma\left(\frac{n+1}{\rho}\right).$$

In step S22, the distribution selection module 12 determines whether or not a compromise marker is set by the user (or the control module 14), indicating that an interpolation between a Pareto tail characteristic and an exponential tail characteristic is desired.

If a compromise marker is set, the distribution selection module 12 selects, in step S23, the Convex Loggamma distribution as the loss distribution.

Otherwise, if the tail characteristic, determined in step S21, is a Pareto tail characteristic, the distribution selection module 12 selects, in step S25, the Convex Beta, Convex Logistic or Second Pareto distribution as the loss distribution. The choice between Convex Beta, Convex Logistic or Second Pareto, depends on the size of the excess points. Convex Beta is used for medium to low excess (e.g. 100'000 USD to 5 Mio. USD), Convex Logistic is used for medium excess (e.g. 1 Mio. USD to 5 Mio. USD), whereas Second Pareto is used for high excess (e.g. 10 Mio. USD). Furthermore, in steps S26 and S27, the distribution selection module 12 retrieves from the database 15 the parameter $\alpha_{Pareto}$ and the Pareto (tail) threshold associated with the selected line of business, type of risk, or type of random event, respectively.

If the tail characteristic, determined in step S21, is not a Pareto tail characteristic, i.e. it is an Exponential tail characteristic, in step S28, the distribution selection module 12 selects the Convex Gamma or Benktander distribution as the loss distribution. As both distribution functions produce generally equally good results, the choice can be based on the quality of the fit to the actual historical data. Furthermore, in step S29, the distribution selection module 12 retrieves from the database 15 the Exponential (tail) threshold associated with the selected line of business, type of risk, or type of random event, respectively.

Subsequent to step S2, the control module 14 activates the fitting module 13. The fitting module 13 is configured to perform steps S3, S4, and S5 as described below with reference to FIG. 2.

In step S3, the fitting module 13 selects a starting excess (xs) point. The starting excess point is selected in the range of the known historical losses, included in the historical data selected in step S1. If the chosen starting excess point for the historical data is higher than the Pareto threshold itself, the Pareto distribution is preferably used directly as the loss distribution. In this case, the two parameters, $x_0$ and $\alpha$, are either fitted or, preferably, entered without even fitting.

In step S4, the fitting module 13 fixes the loss distribution function, selected in step S2, to the starting excess point, selected in step S3.

In step S5, the fitting module 13 determines whether the tail threshold, retrieved in step S27 or S29, respectively, exceeds the known historical losses by a defined margin, for example by a defined order of magnitudes. For such cases, where the known historical losses are significantly lower than the tail threshold, the fitting module 13 issues an alert message, informing the user that a different approach should be chosen, and/or, in step S51, the fitting module 13 determines in an alternative way the course of the loss distribution function beyond the tail threshold. Subsequently, the fitting module 13 fits the loss distribution function to the historical data, selected in step S1.

For fitting the Convex Beta distribution, $\alpha_{Pareto}$ is fixed to the value selected in step S26, thereby the number of free parameters is reduced to two parameters ($\rho, \omega$) in the fitting procedure. Parameter $\rho$ is a shape parameter that "molds" the curve around the historical data all the way, from the starting excess point to the beginning of the tail. While the latter is exclusively determined by the $\alpha_{Pareto}$, the percentile at which the tail actually begins is rather determined by $\rho$. Thus $\rho$ plays a role as well in the severity of the distribution. The larger $\rho$, the less severe the distribution will be. With an increase of the starting excess point, $\rho$ will tend to 1 and thus Convex Beta will typically tend to Second Pareto. As $\rho$ is playing a role for the whole range of the curve, it is well determined by the fitting procedure, provided we have enough data above the chosen starting excess point: $\rho$ will be in fact determined by the low to medium losses, typically the most numerous losses. Thus, in order to obtain a good value for $\rho$, which is critical for the severity of the curve, needed is a sufficient quantity of known losses in that range. Unlike $\alpha_{Pareto}$, $\rho$ depends on the chosen starting excess point as well and is not a universal value typical of an industry or line of business. Parameter $\omega$ is a scaling parameter, that magnifies and shrinks a curve depending on unit, currency and/or trend. The larger $\omega$, the more severe the distribution will be. This means that $\omega$ as well determines the percentile at which the tail will attach. Parameter $\omega$ will be well determined by the fit, since it affects the whole curve, just like $\rho$. However, $\omega$ is changing its value quite rapidly depending on the situation and it is thus not so easy to get a feeling for what its value should be, as opposed to $\rho$, which stays around 1. The combination $\omega^{1/\rho}$, on the other hand, will be more stable and will be of the order of magnitude of the chosen starting excess point. The combination $\omega^{1/\rho}$ enables a better parametrization for Convex Beta than $\omega$ alone. Both parameters, $\rho$ and $\omega$, will be determined correctly by the fitting process, given the weight of the low- and medium losses which should be quite numerous, i.e. the losses that are not yet in the tail, which form the bulk of losses. At the same time $\rho$ and $\omega$ will determine the percentile at which the tail will begin.

For fitting the Second Pareto distribution, $\alpha_{Pareto}$ is fixed to the value selected in step S26, and thus only one free parameter, $\omega$, needs to be determined. Comments about $\omega$ provided above for Convex Beta also apply to Second Pareto, however, because $\omega^{1/\rho}=\omega$, $\omega$ is already a "stable" parameter for Second Pareto. If the starting excess point is further increased, $\omega$ will tend to the excess point and Second Pareto will tend to the Pareto distribution.

The Pareto distribution itself has no free parameter anymore because the scale parameter $\omega$ is merged with the excess point. All the scaling information is included in the excess point itself, meaning that the threshold at which the Pareto regime will begin may be subject to trending for instance.

The Convex Gamma distribution has two free parameters, $\rho$ and $\omega$, that need to be determined through the fitting process. Again, $\rho$ is a shape parameter that "molds" the curve around the historical data all the way, from the starting excess point to the beginning of the tail. While the tail is entirely exponential, the percentile at which the tail actually begins is determined by $\rho$. Thus $\rho$ plays a role as well in the severity of the distribution. The larger $\rho$, the less severe the distribution will be. With an increase of the starting excess point, typically, $\rho$ will tend to 1 and thus Convex Gamma will tend to the Exponential distribution. As $\rho$ is playing a role for the whole range of the curve, it is well determined by the fitting procedure, provided there is enough data above the chosen starting excess point: $\rho$ will be in fact determined by the low to medium losses, typical, the most numerous losses. Thus, in order to obtain a good value for $\rho$, which is critical for the severity of the curve, needed is a sufficient quantity of known losses in that range. Unlike the exponential behavior itself, $\rho$ depends on the chosen starting excess point as well and is not a universal value typical of an industry or line of business. Parameter $\omega$ is a scaling parameter, that magnifies and shrinks a curve depending on unit, currency and/or trend. The larger $\omega$, the more severe the distribution will be. This means that $\omega$ as well determines the percentile at which the tail will attach. Parameter $\omega$ will be well determined by the fit, since it affects the whole curve, just like $\rho$. However, $\omega$ is changing its value quite rapidly depending on the situation and it is thus not so easy to get a feeling for what its value should be, as opposed to $\rho$, which stays around 1. The combination $\omega^{1/\rho}$, on the other hand, will be more stable and will be of the order of magnitude of the chosen starting excess point. The combination $\omega^{1/\rho}$ enables a better parametrization for Convex Gamma than $\omega$ alone. Both parameters, $\rho$ and $\omega$, will be determined correctly by the fitting process, given the weight of the low and medium losses which should be quite numerous, i.e. the losses that are not yet in the tail, which form the bulk of losses. At the same time $\rho$ and $\omega$ will determine the percentile at which the tail will begin.

For fitting the Exponential distribution, only one free parameter, $\omega$, needs to be determined. Comments about $\omega$ provided above for Convex Gamma also apply to the Exponential distribution, however, because $\omega^{1/\rho}=\omega$, $\omega$ is already a "stable" parameter for the Exponential distribution.

For the Benktander distribution as well as for the Convex Loggamma distribution, the excess point, which is the parameter $x_0$, has to be explicitly fixed before the fit. Convex Loggamma has then two free parameters, $\alpha$ and $\rho$. The parameter $\rho$ governs the tail behavior and varies between 1 and infinity. For $\rho=1$ we have a Pareto tail whose exponent is simply $\alpha$ (by the way, having a $\rho<1$ makes the tail more severe than Pareto which makes little sense for a loss distribution). Having $\rho>1$ makes the tail less severe than Pareto and the larger $\rho$, the less severe the tail will be. For a sufficiently large $\rho$, an exponential tail is obtained. The parameter $\alpha$ determines the shape of the distribution, but only when $\rho>1$ of course. Thus, parameter $\alpha$ determines as well at which percentile the tail will begin. The larger $\alpha$, the less severe the distribution will be. Note that there is no true scaling parameter in this distribution. The parameters $\alpha$ and $\rho$ are scale invariant and the whole scaling of the distribution is done via the excess point $x_0$ just like for the Pareto distribution, for instance.

An interesting value for $\rho$ is 2, which gives a lognormal tail. This new distribution will be called Convex Lognormal and will replace the lognormal distribution for high excess fitting. It has then a single free parameter, $\alpha$, determining the shape of the distribution.

Both Convex Loggamma and Convex Lognormal can be used where intermediate tail behavior is needed. In fact a Convex Loggamma fit will give quite often a value of $\rho$ close to 2. There is however no general rule about the value of $\rho$. It can be controlled between 1 and 3. Otherwise, one can rely on an "average" lognormal tail.

In step S6, the control module 14 produces an output including the selected, fixed, and fitted loss distribution function. For example, the output is produced in form of a report printed on printer 4 or shown on display 16. In the form of the loss distribution, the report indicates for an institution the risk of losses associated with the selected line of business, for an insurance account the risk of losses associated with a certain type of risk, and/or for an entity impacted by a certain type of random event an estimated distribution of random event occurrence.

For cases where the fitting module 13 determines in step S5 that the trended Pareto threshold is significantly larger than the largest, trended, historical loss, the fitting module 13 determines, in step S51, the course of the loss distribution function beyond the tail threshold by setting $\alpha_{Pareto}$ lower than the value determined in step S26, for example. For example, as a rough rule of thumb, the exponent is decreased by 10% per 8 millions of difference between the Pareto threshold and the largest historical loss. For example: if the Pareto exponent $\alpha_{Pareto}$ is 1.8 at 20 millions (trended) and if the largest historical loss is 4 millions (trended), then an $\alpha_{Pareto}$ of 1.6 is used for the fit.

An analysis of historical data has shown that the local severity of loss distributions always decreases, before it reaches the Pareto threshold where it stabilizes to the value of $\alpha_{Pareto}$. In other words, before stabilizing in $\alpha_{Pareto}$, a tail below the Pareto threshold is always more severe than in the Pareto regime. Of course, in the extrapolation zone, beyond the Pareto threshold that will eventually be reached, the assessment becomes too conservative. This should not be a problem, since in this case, there is an account having too few large losses and the result is a (very) low expected loss anyway. For an even more accurate expected loss beyond the Pareto threshold, the fit is truncated at the Pareto threshold and, subsequent to the Pareto threshold, inserted is a pure Pareto distribution with the "normal" $\alpha_{Pareto}$.

For cases where the fitting module 13 determines in step S5 that the trended Exponential threshold is significantly larger than the largest, trended, historical loss, the fitting module 13 determines, in step S51, the course of the loss distribution function beyond the tail threshold by using a "fake" Pareto exponent $\alpha_{Pareto}$ lower or equal to 2, for example. For example, as a rough rule of thumb, the exponent is set to a value of 2 at the Exponential threshold and is decreased by 10% per 8 millions of difference between the Exponential threshold and the largest historical loss. For example, if the Exponential threshold is at 20 millions (trended) and if the largest historical loss is 4 millions (trended), then a $\alpha_{Pareto}$ of 1.8 is used for the fit.

An analysis of historical data has shown that the local severity of loss distributions always decreases before it reaches the Exponential threshold where it stabilizes. In other words, before stabilizing in the Exponential regime a tail below the Exponential threshold is always more severe than in the Exponential regime and corresponds to an $\alpha_{Pareto}$ of 2, immediately before turning to the real Exponential regime. Of course, in the extrapolation zone, beyond the Pareto threshold that will eventually be reached, the assessment becomes too conservative. This should not be a problem, since in this case, there is an account having too few large losses and the result is a (very) low expected loss. For an even more accurate expected loss beyond the Exponential threshold, the fit is truncated at the Exponential threshold and, subsequent to the Exponential threshold, inserted is a pure Exponential distribution.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

What is claimed is:

1. A method for outputting a loss distribution for a line of business, the method comprising:
    receiving, by a computer, a selection of the line of business;
    selecting, by the computer, historical data regarding losses associated with the selected line of business from a database;
    determining, by the computer, a tail characteristic and a tail threshold, for the selected line of business, based on the historical data regarding losses associated with the selected line of business;
    selecting, by the computer, a loss distribution function having a cumulative distribution function with a negative second derivative based on the tail characteristic and the tail threshold specific to the line of business;
    selecting, by the computer, a starting excess point in a range of the historical data regarding losses;
    fixing, by the computer, the loss distribution function to the starting excess point;
    fitting, by the computer, the loss distribution function to the historical data regarding losses; and
    outputting, by the computer, a loss distribution for the selected line of business based on the fitting.

2. The method of claim 1, wherein selecting the loss distribution function includes, selecting a distribution function that is reducible to a Convex Beta distribution, the Convex Beta distribution being derived from the Generalized Beta distribution by setting $\alpha_{Pareto}=\alpha \cdot \rho$ and $\beta=1/\rho$, and by keeping $\omega=\omega$ and $\rho=\rho$.

3. The method of claim 1, wherein selecting the loss distribution function includes, for a line of business associated with a Pareto tail characteristic, selecting a Convex Beta distribution, the Convex Beta distribution being derived from the Generalized Beta distribution by setting $\alpha_{Pareto}=\alpha \cdot \rho$ and $\beta=1/\rho$, and by keeping $\omega=\omega$ and $\rho=\rho$; and wherein the starting excess point is selected from values greater than zero,
    wherein $\alpha$ is a shape parameter representing the tail characteristic, $\alpha_{Pareto}$ is a shape parameter representing the Pareto tail characteristic, $\beta$ is another shape parameter, $\omega$ is a scaling parameter, and $\rho$ is a shape parameter representing a point at which the tail characteristic begins for the loss distribution function.

4. The method of claim 3, wherein $\alpha_{Pareto}$ is selected specifically for the line of business, and wherein the loss distribution function is fitted to the historical losses by adjusting parameters $\rho$ and $\omega$ of the Convex Beta distribution.

5. The method of claim 3, wherein $\alpha_{Pareto}$ is selected from a table comprising different values of $\alpha_{Pareto}$ associated with different lines of business; and wherein these different values of $\alpha_{Pareto}$ are each determined from historical losses, associated with the respective line of business.

6. The method of claim 1, wherein selecting the loss distribution function includes, for a line of business associated with a Pareto tail characteristic, selecting one of Convex Beta distribution, Second Pareto distribution, Pareto distribution, and Convex Logistics distribution, the Convex Logistics distribution being derived from the Inverse Burr distribution by setting $\beta=1/\rho$ and $\alpha_{Pareto}=\rho$, and by keeping $\omega=\omega$.

7. The method of claim 1, wherein selecting the loss distribution function includes, for a line of business associated with an exponential tail characteristic, selecting one of Convex Gamma distribution, Benktander distribution, and Exponential distribution, the Convex Gamma distribution being derived from the Transformed Gamma distribution by setting $\alpha=1/\omega$ and $\omega_{New}=1/\beta$, and by keeping $\rho=\omega$.

8. The method of claim 1, wherein selecting the loss distribution function includes, selecting from a table a tail threshold specific to the line of business, and issuing an alert message when the tail threshold exceeds the known historical losses by a defined margin.

9. The method of claim 1, wherein selecting the loss distribution function includes, selecting a Convex Log gamma distribution, the Convex Log gamma distribution being derived from the Transformed Log gamma distribution by setting $\alpha=1/\omega$, $\omega_{New}=\beta^{1/\omega}$, and $\rho=\omega$.

10. The method of claim 1, wherein selecting the loss distribution function includes, for a line of business associated with a Pareto tail characteristic and for a starting excess point higher than a tail threshold specific to the line of business, selecting the Pareto distribution and selecting from a table $\alpha_{Pareto}$ specific to the line of business.

11. The method of claim 1, wherein determining the tail characteristic includes selecting from a table comprising different tail characteristics associated with different lines of business, the different tail characteristics each being determined from historical data regarding losses associated with each of the different lines of business.

12. The method of claim 1, wherein parameters specifying the tail characteristic and the tail threshold are stored in a database prior to selecting the loss distribution function.

13. A non-transitory computer-readable storage medium having computer readable program codes embodied in the computer readable storage medium that, when executed, control at least one processor of a computer, such that the computer outputs a loss distribution for a line of business, by:
    receiving a selection of the line of business;
    selecting historical data regarding losses associated with the selected line of business from a database;

determining a tail characteristic and a tail threshold, for the selected line of business, based on the historical data regarding losses associated with the selected line of business;

selecting a loss distribution function having a cumulative distribution function with a negative second derivative based on the tail characteristic and the tail threshold specific to the line of business;

selecting a starting excess point in a range of the historical data regarding losses;

fixing the loss distribution function to the starting excess point;

fitting the loss distribution function to the historical data regarding losses; and outputting a loss distribution for the selected line of business based on the fitting.

14. The non-transitory computer-readable storage medium of claim 13, comprising further computer program code controlling the processors, such that the computer selects a loss distribution function that is reducible to a Convex Beta distribution, the Convex Beta distribution being derived from the Generalized Beta distribution by setting $\alpha_{Pareto}=\alpha\cdot\rho$ and $\beta=1/\rho$, and by keeping $\omega=\omega$ and $\rho=\rho$.

15. The non-transitory computer-readable storage medium of claim 13, further comprising computer readable program code controlling the at least one processor, such that the computer, for a line of business associated with a Pareto tail characteristic, selects as a loss distribution function a Convex Beta distribution, the Convex Beta distribution being derived from the Generalized Beta distribution by setting $\alpha_{Pareto}=\alpha\cdot\rho$ and $\beta=1/\rho$, and by keeping $\omega=\omega$ and $\rho=\rho$; and selects the starting excess point from values greater than zero, wherein $\alpha$ is a shape parameter representing the tail characteristic, $\alpha_{Pareto}$ is a shape parameter representing the Pareto tail characteristic, $\beta$ is another shape parameter, $\omega$ is a scaling parameter, and $\rho$ is a shape parameter representing a point at which the tail characteristic begins for the loss distribution function.

16. The non-transitory computer-readable storage medium of claim 15, further comprising computer readable program code controlling the at least one processor, such that the computer, selects $\alpha_{Pareto}$ specifically for the line of business, and fits the loss distribution function to the historical losses by adjusting parameters $\rho$ and $\omega$ of the Convex Beta distribution.

17. The non-transitory computer-readable storage medium of claim 15, further comprising computer readable program code controlling the at least one processor, such that the computer selects $\alpha_{Pareto}$ from a table comprising different values of $\alpha_{Pareto}$ associated with different lines of business, the different values of $\alpha_{Pareto}$ being each determined from historical losses, associated with the respective line of business.

18. The non-transitory computer-readable storage medium of claim 13, comprising further computer program code controlling the processors, such that the computer selects as the loss distribution function, for a line of business associated with a Pareto tail characteristic, one of Convex Beta distribution, Second Pareto distribution, Pareto distribution, and Convex Logistics distribution, the Convex Logistics distribution being derived from the Inverse Burr distribution by setting $\beta=1/\rho$ and $\alpha_{Pareto}=\rho$, and by keeping $\omega=\omega$.

19. The non-transitory computer-readable storage medium of claim 13, comprising further computer program code controlling the processors, such that the computer selects as the loss distribution function, for a line of business associated with an exponential tail characteristic, one of Convex Gamma distribution, Benktander distribution, and Exponential distribution, the Convex Gamma distribution being derived from the Transformed Gamma distribution by setting $\alpha=1/\omega$ and $\omega_{New}=1/\beta$, and by keeping $\rho=\omega$.

20. The non-transitory computer-readable storage medium of claim 13, comprising further computer program code controlling the processors, such that the computer selects from a table a tail threshold specific to the line of business, and issues an alert message when the tail threshold exceeds the known historical losses by a defined margin.

21. The non-transitory computer-readable storage medium of claim 13, comprising further computer program code controlling the processors, such that the computer selects as the loss distribution function a Convex Log gamma distribution, the Convex Log gamma distribution being derived from the Transformed Log gamma distribution by setting $\alpha=1/\omega$, $\omega_{New}=\beta^{1/\omega}$, and $\rho=\omega$.

22. The non-transitory computer-readable storage medium of claim 13, comprising further computer program code controlling the processors, such that the computer selects as the loss distribution function, for a line of business associated with a Pareto tail characteristic and for a starting excess point higher than a tail threshold specific to the line of business, the Pareto distribution, and selects from a table $\alpha_{Pareto}$ specific to the line of business.

23. The non-transitory computer-readable storage medium of claim 13, comprising further computer program code controlling the processors, such that, in the determining of the tail characteristic, the computer selects the tail characteristic from a table comprising different tail characteristics associated with different lines of business, the different tail characteristics each being determined from historical data regarding losses associated with each of the different lines of business.

24. The non-transitory computer-readable storage medium of claim 13, wherein parameters specifying the tail characteristic and the tail threshold are stored in a database prior to selecting the loss distribution function.

25. A computer system for outputting a loss distribution for a line of business, the system comprising:

a processor having instructions embedded therein, said instructions, when executed by the processor, causes the processor to:

receive a selection of the line of business;

select historical data regarding losses associated with the selected line of business from a database;

determine a tail characteristic and a tail threshold, for the selected line of business, based on the historical data regarding losses associated with the selected line of business;

select a loss distribution function having a cumulative distribution function with a negative second derivative based on the tail characteristic and the tail threshold specific to the line of business;

select a starting excess point in a range of the historical data regarding losses;

fix the loss distribution function to the starting excess point;

fit the loss distribution function to the historical data regarding losses; and output a loss distribution for the selected line of business based on the fitting.

26. The computer system of claim 25, wherein parameters specifying the tail characteristic and the tail threshold are stored in a database prior to selecting the loss distribution function.

27. A computer system for outputting a loss distribution for a line of business, the system comprising:

means for receiving a selection of the line of business;

means for selecting historical data regarding losses associated with the selected line of business from a database;

means for determining a tail characteristic and a tail threshold, for the selected line of business, based on the historical data regarding losses associated with the selected line of business;

means for selecting a loss distribution function having a cumulative distribution function with a negative second derivative based on the tail characteristic and the tail threshold specific to the line of business;

means for selecting a starting excess point in a range of the historical data regarding losses;

means for fixing the loss distribution function to the starting excess point;

means for fitting the loss distribution function to the historical data regarding losses; and means for outputting a loss distribution for the selected line of business based on the fitting.

* * * * *